UNITED STATES PATENT OFFICE.

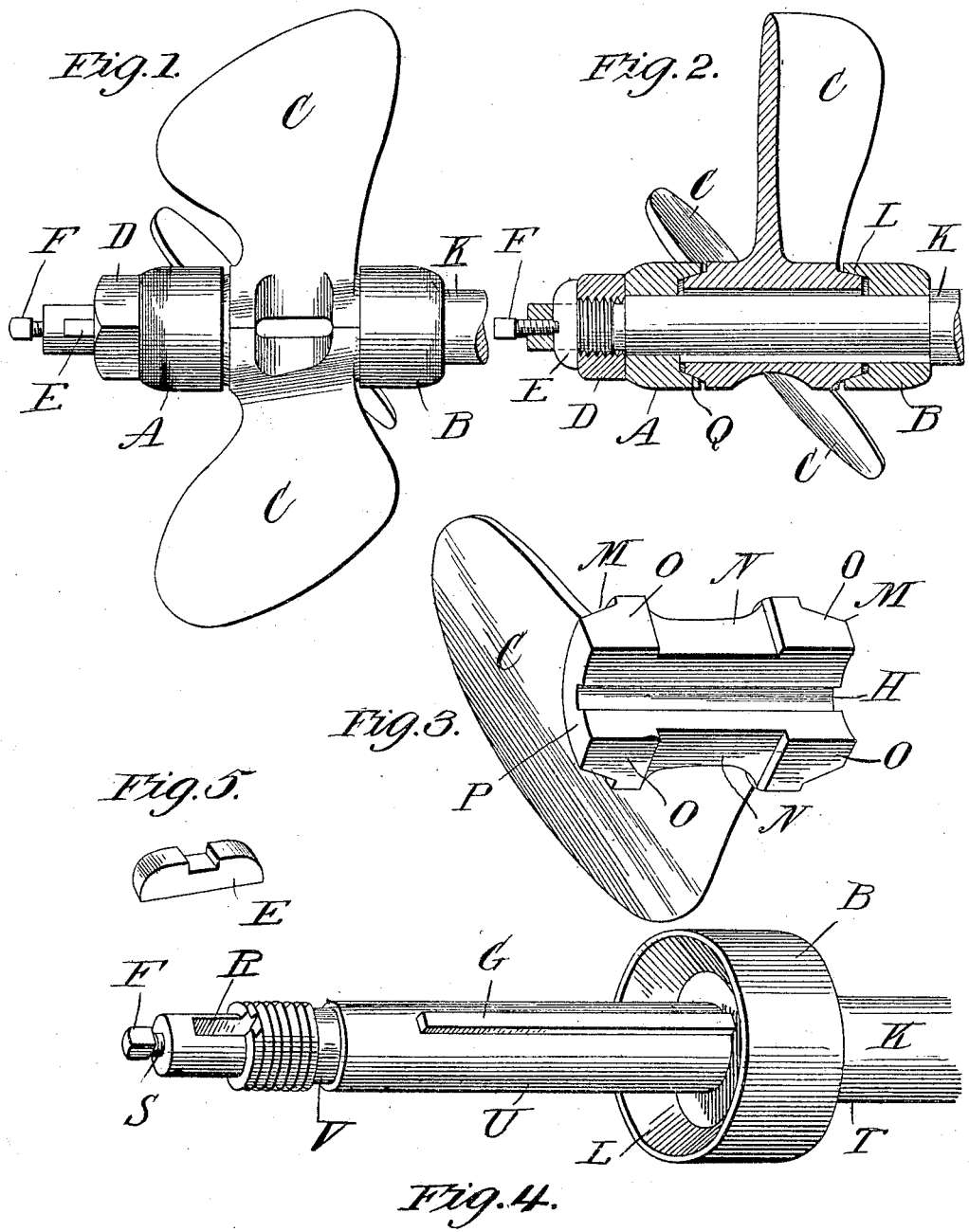

EDGAR HUMPHREY AND MAURICE R. WILLIAMS, OF CORDOVA, ILLINOIS.

SECTIONAL PROPELLER.

No. 856,586.  Specification of Letters Patent.  Patented June 11, 1907.

Application filed March 12, 1907. Serial No. 361,948.

*To all whom it may concern:*

Be it known that we, EDGAR HUMPHREY and MAURICE R. WILLIAMS, both of Cordova, in the county of Rock Island and the State of Illinois, have invented a new and Improved Sectional Propeller, of which the following is a full, clear, and exact description.

The object of the invention is to provide a new and improved propeller which is simple and durable in construction and arranged to conveniently assemble the several parts to secure the same in position without the use of bolts and to permit of removing any one individual blade without disturbing the others.

The invention is more particularly an improvement in the class of propellers whose blades are made separate from each other and secured to a hub by means of collars on a rotatable shaft.

In the accompanying drawings, Figure 1 is a side view of the propeller with all the parts assembled. Fig. 2 is a sectional view of the hub and collars, locking nut and notched cotter. Fig. 3 is a perspective view of an individual propeller blade integral with its hub sector. Fig. 4 is a side perspective view of the rotatable shaft with its fixed tail collar, transverse slot and axial set screw. Fig. 5 is a detail view of the notched cotter.

Similar letters of reference designate corresponding parts throughout the several views of the drawings.

Referring to Figs. 1 and 2, A and B represent the collars, C the blades, D the locking nut, E the notched cotter, F the axial set screw.

Referring to Figs. 3 and 4, H is a channeled recess or key way, adapted to receive the spline G on the rotatable shaft K. L is a frusto-conical recess in front and rear collars adapted to receive the frusto-conical ends of the hub-sectors, M. The channeled spaces N, admit exact engagement of the faces O on the hub sectors.

The propeller is ordinarily composed of three blades, all of which are constructed identically. In assembling our invention, the first blade is so placed within the opening L in the tail collar B, that the channel H receives the spline G. The remaining blades are introduced within the recess L and when the several blades are so assembled, the several hub sectors P completely inclose the shaft K. The cap A is then slipped over the end of the shaft K and incloses the forward ends of the hub sectors within a frusto-conical recess Q the counterpart of the recess L on the tail collar. The lock-nut D is then secured by its thread to the shaft K, the notched cotter E is inserted in the transverse slot R and retained in position by the set screw F threaded into an aperture S, axially disposed in the extremity of the shaft. The shaft has three reductions in diameter, shown at T, U and V in Fig. 3.

By means of our arrangement of the parts of the propeller any blade that may be injured can be readily removed and one or more new blades inserted without materially interfering with the other parts of the vessel.

Having thus described our invention, we claim as new and desire to secure by Letters Patent—

1. A propelling device for ships comprising a rotatable shaft a sectional hub provided with blades, each end of the outer periphery of the assembled hub having the form of the frustum of a cone, collars provided with frusto-conical recesses, mounted on said shaft and engaging the ends of said hub, locking means for securing said parts in place.

2. A propelling device for ships comprising a rotatable shaft having a seat of reduced section, a fixed collar at the shouldered end of said seat, a spline on said seat, a screw propeller mounted on said seat and held from rotation by said spline, a loose collar mounted on the outer end of said shaft and engaging the propeller hub, a threaded portion on said shaft adjacent to the outer end of said reduced section, a locking nut for engaging said threaded portion an extended end of said shaft of further reduced section, provided with a transverse slot adjacent to the threaded section and an axially threaded aperture intersecting said slot, a notched cotter adapted to be received into said slot and engaging said nut, and a set screw in said axial aperture engaging said cotter.

3. A propelling device for ships comprising a rotary shaft propeller blades mounted thereon said blades having a hub with frusto-conical ends, a pair of collars each having frusto-conical recesses engaging the ends of said hub, a clamping means for forcing said parts together.

In testimony whereof we have signed our names to this specification, in the presence of two subscribing witnesses.

EDGAR HUMPHREY.
MAURICE R. WILLIAMS.

Witnesses:
IRA KARR,
CHAS. BLACK.